(12) United States Patent
Huang et al.

(10) Patent No.: US 8,550,686 B2
(45) Date of Patent: Oct. 8, 2013

(54) DISPLAY PANEL AND A LIGHT SOURCE USED THEREIN

(75) Inventors: Hsin-Tao Huang, Hsin-Chu (TW);
Deng-Kuen Shiau, Hsin-Chu (TW);
Chun-Chi Hsu, Hsin-Chu (TW);
Chun-Chung Hsiao, Hsin-Chu (TW);
Mao-Wei Lin, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 13 days.

(21) Appl. No.: 13/324,944

(22) Filed: Dec. 13, 2011

(65) Prior Publication Data
US 2012/0140434 A1 Jun. 7, 2012

Related U.S. Application Data

(62) Division of application No. 12/701,680, filed on Feb. 8, 2010, now Pat. No. 8,096,696, which is a division of application No. 12/028,978, filed on Feb. 11, 2008, now Pat. No. 8,092,067.

(30) Foreign Application Priority Data

Mar. 15, 2007 (TW) ................................ 96108999 A

(51) Int. Cl.
*G02F 1/13357* (2006.01)
(52) U.S. Cl.
USPC ............................ 362/618; 362/631; 362/97.3
(58) Field of Classification Search
USPC .......................... 362/631, 618, 617, 630, 97.3
See application file for complete search history.

(56) References Cited

U.S. PATENT DOCUMENTS

| 5,386,347 A | 1/1995 | Matsumoto |
| 5,521,796 A | 5/1996 | Osakada et al. |

(Continued)

FOREIGN PATENT DOCUMENTS

| CN | 1584715 | 2/2005 |
| TW | 200519485 A | 6/2005 |

(Continued)

OTHER PUBLICATIONS

Taiwan Office Action mailed Jun. 2, 2011.

(Continued)

*Primary Examiner* — Jong-Suk (James) Lee
*Assistant Examiner* — Leah S Macchiarolo
(74) *Attorney, Agent, or Firm* — McClure, Qualey & Rodack, LLP

(57) ABSTRACT

A display panel and a light source device used therein are provided. The display panel includes a light-guide thin-film circuit substrate, a light source and a polarizing layer. The light-guide thin-film circuit substrate has a light entrance end and a light exit top surface, and the light source is disposed corresponding to the light entrance end. The polarizing layer is disposed on the light-guide thin-film circuit substrate and parallels the light exit top surface of the light-guide thin-film circuit substrate. The light produced by the light source enters the circuit substrate through the light entrance end, guided and transmitted through the circuit substrate, and then leaves the circuit substrate through the light exit top surface and enters the polarizing layer. The light after passing through the polarizing layer is turned into a polarized light having flat light source effect as a backlight source for the system.

2 Claims, 11 Drawing Sheets

(56) References Cited

U.S. PATENT DOCUMENTS

| | | |
|---|---|---|
| 5,560,698 A | 10/1996 | Okano |
| 5,584,556 A | 12/1996 | Yokoyama et al. |
| 6,074,069 A | 6/2000 | Chao-Ching et al. |
| 6,124,907 A | 9/2000 | Jones et al. |
| 6,796,669 B2 | 9/2004 | Masuda |
| 6,917,400 B2 | 7/2005 | Nakamura et al. |
| 6,927,911 B2 | 8/2005 | Tsai et al. |
| 7,001,035 B2 * | 2/2006 | Kawakami .................. 362/617 |
| 8,164,709 B2 * | 4/2012 | Chen .............................. 349/65 |
| 2002/0024624 A1 * | 2/2002 | Takenaka ..................... 349/110 |
| 2003/0030764 A1 | 2/2003 | Lee |
| 2003/0156403 A1 | 8/2003 | Ohkawa |
| 2004/0051927 A1 | 3/2004 | Tsai et al. |
| 2005/0157521 A1 | 7/2005 | Chen et al. |
| 2006/0055850 A1 | 3/2006 | Murata et al. |
| 2006/0091412 A1 * | 5/2006 | Wheatley et al. ............... 257/98 |
| 2006/0203140 A1 * | 9/2006 | Kim ................................ 349/58 |
| 2006/0274551 A1 * | 12/2006 | Takada ......................... 362/611 |
| 2007/0041172 A1 | 2/2007 | Son et al. |
| 2007/0222917 A1 | 9/2007 | Ono |

FOREIGN PATENT DOCUMENTS

| | | |
|---|---|---|
| TW | 200530704 A | 9/2005 |
| TW | 200602716 A | 1/2006 |
| TW | M307133 | 3/2007 |

OTHER PUBLICATIONS

English translation of portions of TW 200519485 A, TW M307133 and TW 200602716 A.

* cited by examiner

DISPLAY PANEL AND A LIGHT SOURCE USED THEREIN

This application is a divisional application of U.S. application Ser. No. 12/701,680, filed on Feb. 8, 2010, now U.S. Pat. No. 8,096,696, which is a divisional application of U.S. Ser. No. 12/028, 978, filed on Feb. 11, 2008, now U.S. Pat. No. 8,092,067, which claimed the benefit from the priority of Taiwan Patent Application No. 096108999 filed on May 15, 2007, the disclosures of which are incorporated by reference herein in their entirety.

BACKGROUND OF THE INVENTION

1. Field of the Invention

The present invention relates generally to display panels and light source modules used therein, and more particularly to a liquid crystal display (LCD) panel and a light source module used therein.

2. Description of the Prior Art

Various display panels and display panel devices have gradually become the mainstream of the display devices. For example, various display screens, household flat panel TVs, monitors of personal computers and laptops, display screens of mobile phones and digital cameras are typical products using the display panel extensively. The display panels are currently divided into self-luminous display panels including organic light emitting diode (OLED) panels, and non self-luminous display panels requiring external light sources, such as liquid crystal display (LCD) panels.

Due to the volumes of various electronic devices using display panels keep reducing, the thickness of the display panel has to be reduced as well. FIG. 1 shows a schematic view of a conventional LCD panel. As shown in FIG. 1, the display panel includes a light guide plate 10, a reflector 15, optical films 20, a light source 30, a lower substrate 40 and an upper substrate 50. The light source 30 is disposed on one end of the light guide plate 10, and the reflector 15 is disposed under the light guide plate 10. The light produced by the light source 30 enters the light guide plate 10 through the end of the light guide plate 10, and is distributed on the light guide plate 10 through the reflection of the light guide plate 10 and the reflector 15. The optical films 20 including a diffusion sheet, a brightness enhancing film, a polarizer or other types of optical films are disposed above the light guide plate 10. After the light produced by the light source 30 leaves the light guide plate 10, it immediately passes through the optical films 20 for further optical treatment. The lower substrate 40 and the upper substrate 50 are disposed above the optical films 20, and a liquid crystal layer is disposed in between. A thin film circuit is disposed on the lower substrate 40 to control the liquid crystal molecules. The light passing through the optical films 20 goes into the lower substrate 40, and generates images through the upper substrate 50 after passing through the liquid crystal layer.

In this conventional display panel, numerous processes through the light guide plate 10 and the optical films 20 are required in order to produce uniform light output from the light source 30 and polarized properties. However, the light guide plate 10 and the optical films 20 occupy a certain percentage of the overall thickness of the display panel. Accordingly, how to reduce the overall thickness of the display panel by integrating and minimizing the use of the light guide plate 10 and the optical films 20 is an important issue.

SUMMARY OF THE INVENTION

It is an object of the present invention to provide a display panel having a thinner thickness.

It is another object of the present invention to provide a display panel having fewer components.

It is a further object of the present invention to provide a display panel that requires less assembly labor hours and cost.

It is yet another object of the present invention to provide a light source module that reduces the overall thickness of the display panel.

It is still another object of the present invention to provide a light source module that provides polarized light depending on the requirements.

The display panel according to the present invention includes a light-guide thin-film circuit substrate, a reflector, a light source and a polarizing layer. The light-guide thin-film circuit substrate has a light entrance end and a light exit top surface, and the light entrance end is at one end of the light exit top surface. The light source is disposed corresponding to the light entrance end of the light-guide thin-film circuit substrate. The light produced by the light source enters the light-guide thin-film circuit substrate through the light entrance end, guided and transmitted through the light-guide thin-film circuit substrate, and then leaves the circuit substrate through the light exit top surface. The reflector is disposed under the light-guide thin-film circuit substrate for reflecting the light leaking out of the bottom surface of the circuit substrate to enhance the light utilization efficiency, The polarizing layer is disposed on the light-guide thin-film circuit substrate and parallels the light exit top surface of the light-guide thin-film circuit substrate. The relative position between the polarizing layer and the light-guide thin-film circuit substrate may be changed depending on the requirement. For example, the polarizing layer may cover the light exit top surface of the circuit substrate and exists in the form of a polarizing film. However, the polarizing layer may be disposed within the light-guide thin-film circuit substrate, or the whole circuit substrate may be employed as the polarizing layer. After the light is shot from the light exit top surface of the circuit substrate, a polarized light having flat light source effect is formed after passing through the polarizing layer and is employed as a backlight source for the system.

The display panel may further include a plurality of light deviating structures. The light deviating structures are contained at the light-guide thin-film circuit substrate and distributed along a direction parallel to the light exit top surface. The light-guide thin-film circuit substrate guides the light of the light source through the internal reflection to distribute over the light exit top surface, and the light deviating structures cause the light within the circuit substrate to deviate, therefore the internal reflection is further affected and the light output from the light exit top surface is more uniform.

In another embodiment, the display panel includes a light guide substrate, a circuit, a plurality of coupling portions and a light source. The light guide substrate has a light entrance end and a top surface, and the light entrance end is at one end of the top surface. The circuit is formed on the top surface of the light guide substrate. The plurality of coupling portions is disposed on an end surface of the light entrance end. The coupling portions extend to the top surface of the light guide substrate to electrically connect with the circuit. The light source includes a paired pins and a light emitting unit. The paired pins are electrically coupled to the coupling portions respectively, and the light emitting unit is disposed between the paired pins and electrically coupled to the paired pins. The light emitting unit has a light emitting surface facing the light entrance end of the light guide substrate. The light produced by the light emitting unit enters the light entrance end through the light emitting surface, and is guided and distributed over the top surface of the light guide substrate through the light guide substrate.

The light emitting unit may further include a main body and an electroluminescence unit. The main body is disposed between the paired pins and forms an inner space and a light exit. The electroluminescence unit is contained within the inner space of the main body, and the two electrodes are electrically coupled to the paired pins respectively. One side having the light exit of the main body forms an overall light emitting surface, and the polarizer is disposed on the main body and covers the light exit. When the electroluminescence unit produces light, the light is shot from the light exit and turned into a polarized light after passing through the polarizer, and then leaves the light source.

BRIEF DESCRIPTION OF THE DRAWINGS

FIG. 8b is a top view of the embodiment shown in FIG. 8a.

DETAILED DESCRIPTION OF THE PREFERRED EMBODIMENT

The present invention provides a display panel and a light source module used therein. In a preferred embodiment, the display panel according to the present invention includes a liquid crystal display (LCD) panel. The LCD devices refer generally to the display devices using LCD panels, including LC monitors of household LCTVs, personal computers and laptops, and LC display screens of the mobile phones and digital cameras.

Figure 1:
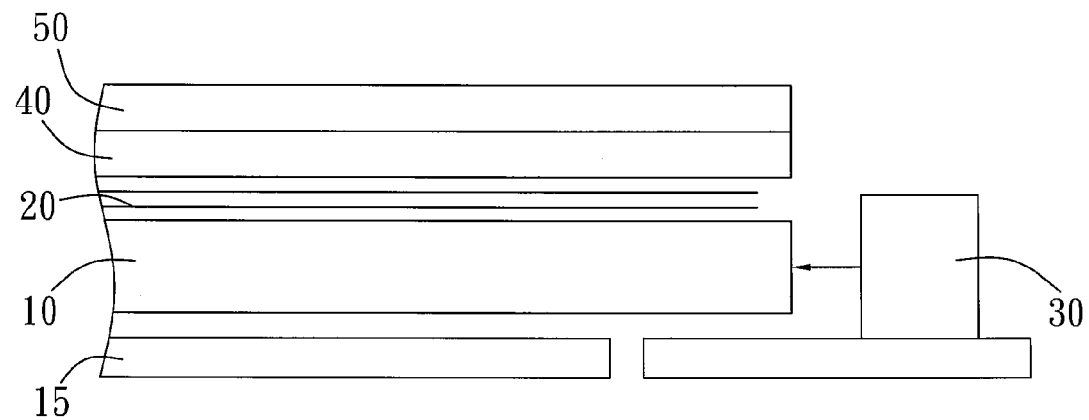
FIG. 1 is a schematic view of a conventional display panel.
Figure 2A:
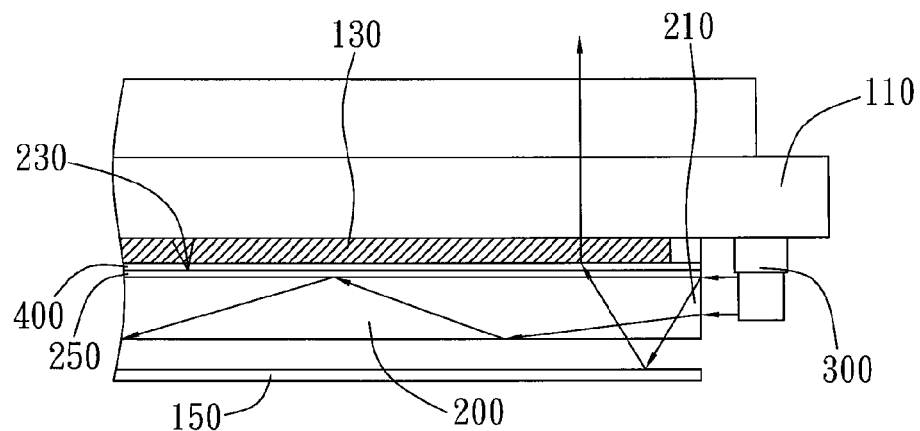
FIG. 2a is a cross-sectional schematic view of the display panel in accordance with one embodiment of the present invention.

As shown in FIG. 2a, the display panel in accordance with the present invention includes a light-guide thin-film circuit substrate 200, a reflector 150, a light source 300 and a polarizing layer 400. The light-guide thin-film circuit substrate 200 has a light entrance end 210 and a light exit top surface 230, and the light entrance end 210 is at one end of the light exit top surface 230. In the preferred embodiment, the light-guide thin-film circuit substrate 200 also includes a thin-film circuit layer 250. The light-guide thin-film circuit substrate 200 is made of transparent or semi-transparent materials; in the preferred embodiment, the light-guide thin-film circuit substrate 200 is made of organic resin materials, glass, quartz, or other transparent or semi-transparent materials.

The light source 300 is disposed corresponding to the light entrance end 210 of the light-guide thin-film circuit substrate 200. Light from the light source 300 enters the circuit substrate 200 through the light entrance end 210, guided and transmitted through the circuit substrate 200, then leaves the circuit substrate 200 through the light exit top surface 230. The light source 300 preferably includes light emitting diodes (LEDs); however, in other embodiments, the light source 300 may include a linear light source and other forms of light source. The reflector 150 is disposed under the circuit substrate 200 for reflecting the light leaking out of the bottom surface of the circuit substrate 200 to enhance the light utilization efficiency. The reflector 150 is preferably made of acrylonitrile butadiene styrene (ABS) copolymers, polycarbonate (PC), or any materials that reflect light; however, in other embodiments, the reflector 150 may be formed on the bottom surface of the circuit substrate 200 directly by electroplating, sputtering, and the like.

In the embodiment shown in FIG. 2a, the display panel further includes an upper substrate 110. The upper substrate 110 is above the light-guide thin-film circuit substrate 200 and overhangs the light entrance end 210. A liquid crystal (LC) layer 130 is disposed between the upper substrate 110 and the circuit substrate 200. The bottom surface of the upper substrate 110 corresponds to the light exit top surface 230 of the circuit substrate 200. The light source 300 is disposed on the bottom surface of the upper substrate 110, and is located on the outside of the light entrance end 210 of the circuit substrate 200. The light source 300 is disposed facing the light entrance end 210, and therefore the light emitting out of the light source 300 can transmit directly into the light entrance end 210.

Figure 2B:
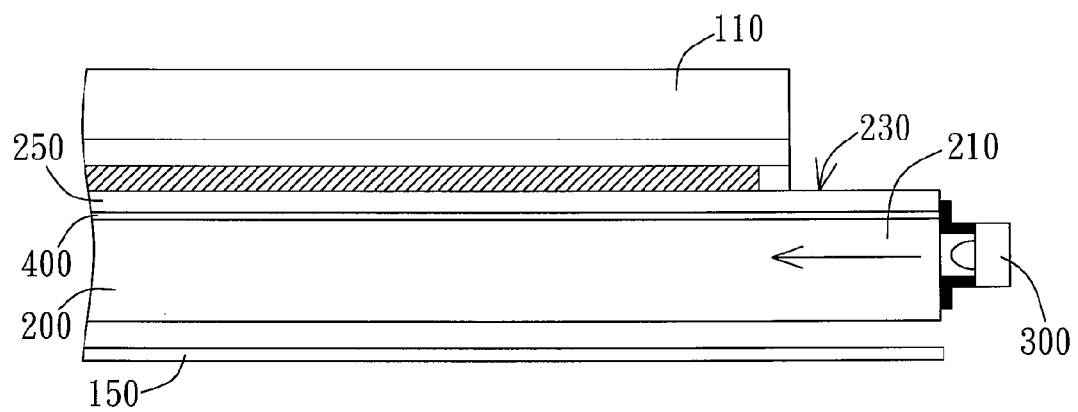
FIG. 2b-FIG. 2d are cross-sectional schematic views of the light source arrangement of the display panel in accordance with another embodiment of the present invention.
Figure 2C:
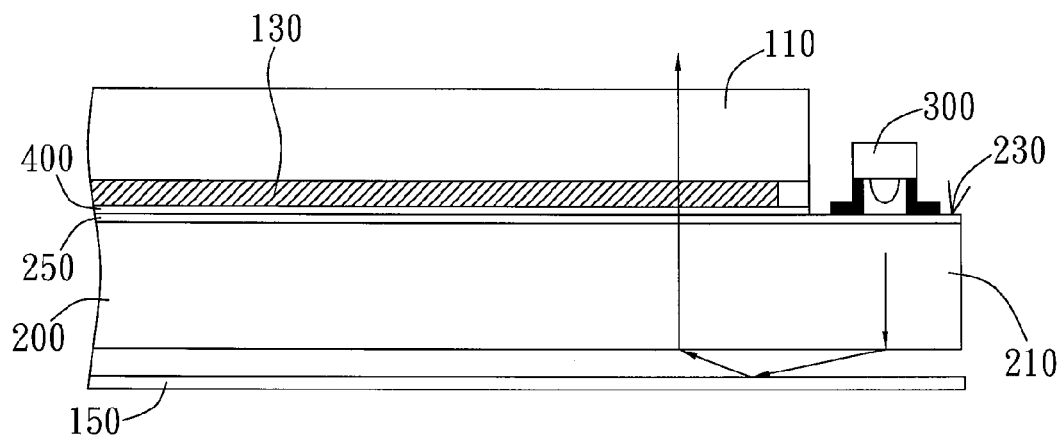

However, in the embodiment shown in FIG. 2b, the light source 300 is directly connected to the light-guide thin-film circuit substrate 200 close to the end surface of light entrance end 210. The light source 300 emits light toward the light entrance end 210, and consequently the light produced by the light source 300 can go directly into the light entrance end 210. FIG. 2c shows another embodiment. In this embodiment, the light source 300 is engaged firmly with the light exit top surface 230 of the circuit substrate 200 close to the light entrance end 210. The light exit surface of the light source 300 faces the light exit top surface 230 and thereby the light produced by the light source 300 enters the circuit substrate 200 through the light exit top surface 230. The light entering the circuit substrate 200 can be distributed throughout the circuit substrate 200 by the reflection effect of the circuit substrate 200 and the reflector 150.

The polarizing layer 400 is disposed on the light-guide thin-film circuit substrate 200 and parallels the light exit top surface 230 of the circuit substrate 200. The above parallel distribution does not limit that the polarizing layer 400 shall distribute on the surface or the interior of the circuit substrate 200. The relative position between the polarizing layer 400 and the circuit substrate 200 can be changed to satisfy various design demands. In the embodiment as shown in FIG. 2a, the polarizing layer 400 covers the light exit top surface 230 of the circuit substrate 200 and exists in the form of a polarizing film. However, in the embodiment shown in FIG. 2b, the polarizing layer 400 is disposed within the circuit substrate 200 and forms an intermediate layer. In other embodiments, the circuit substrate 200 may be employed as the polarizing layer 400. This arrangement also accords with the requirement of the polarizing layer 400 parallel to the light exit top surface 230. Moreover, the polarizing layer 400 is preferably disposed on the thin film circuit layer 250; however, in other embodiments, the polarizing layer 400 may be disposed under the thin film circuit layer 250.

Figure 2D:
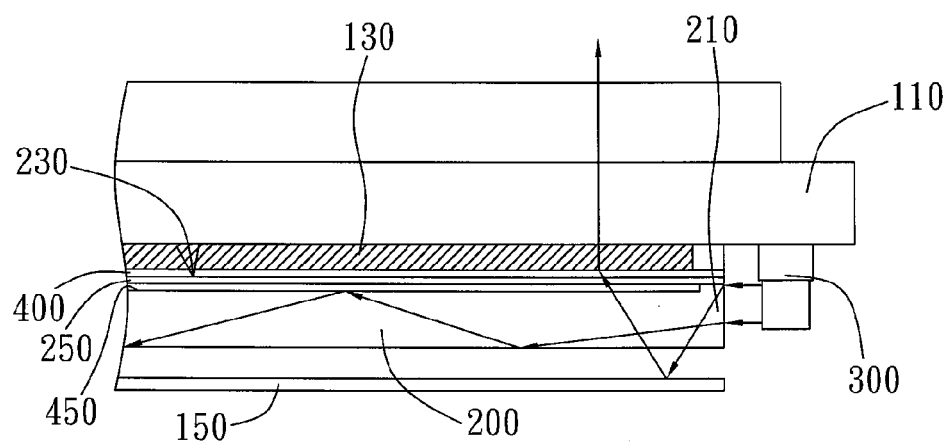

As shown in FIG. 2d, the display panel further includes a low refractive layer 450. The low refractive layer 450 is disposed under the thin film circuit layer 250 of the light exit top surface 230, and the polarizing layer 400 is disposed on the low refractive layer 450. However, in other embodiments, the polarizing layer 400 may be disposed above the thin film circuit layer 250. The refractive index (RI) of the low refractive layer 450 is smaller than that of the light-guide thin-film circuit substrate 200. The light reflection and transmission efficiency within the circuit substrate 200 is enhanced through disposing the low refractive layer 450 to guide a partial light into the back end of the circuit substrate 200. In the preferred embodiment, the low refractive layer 450 is an air layer within the circuit substrate 200. The air layer can be formed by laser, or other package or adhesion methods, etc. However, in other embodiments, the low refractive layer 450 may be formed on the circuit substrate 200 by film coating. In addition, in the embodiment shown in FIG. 2b, when the refractive index of the polarizing layer 400 is smaller than that of the circuit substrate 200 and the polarizing layer 400 is disposed directly under the thin film circuit layer 250, the polarizing layer 400 can replace the low refractive layer 450.

As shown in FIG. 2a, the light-guide thin-film circuit substrate 200 receives the light produced by the light source 300. Next, the light is guided to distribute on the light exit top surface 230 through the optical reflection and refraction produced within the circuit substrate 200 and by the reflector 150 to generate flat light source effect. The light enters the polarizing layer 400 right after emitting out of the light exit top surface 230. The light emitting out of the polarizing layer 400 is turned into a polarized light having the flat light source effect. However, in the embodiment shown in FIG. 2b, the light entering the circuit substrate 200 first passes through the polarizing layer 400 for polarizing treatment, and then emits from the light exit top surface 230.

Figure 3:
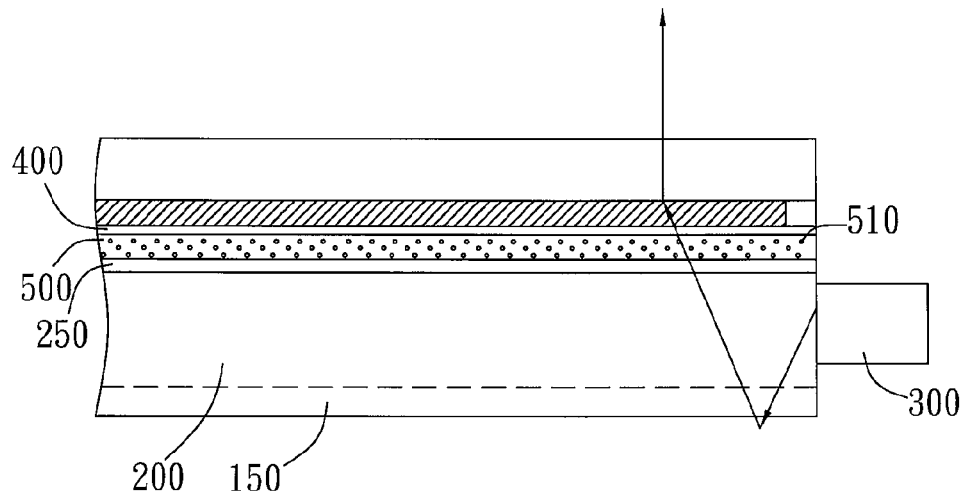
FIG. 3 is a cross-sectional schematic view of the display panel including the diffusion layer in accordance with one embodiment of the present invention.

In the embodiment shown in FIG. 3, the display panel according to the present invention further includes a diffusion layer 500. The diffusion layer 500 is preferably distributed on or within the light-guide thin-film circuit substrate 200 by paralleling the light exit top surface 230. The diffusion layer 500 is disposed on the side facing the circuit substrate 200 of the polarizing layer 400; in other words, when the circuit substrate 200 placed horizontally is viewed, as shown in FIG. 3, the diffusion layer 500 is disposed under the polarizing layer 400. The primary purpose of the diffusion layer 500 is to scatter the passing light to achieve more uniform light output. In this embodiment, the light within the circuit substrate 200 first passes through the diffusion layer 500 to create more scattering light, and only then the light enters the polarizing layer 400 to be polarized.

As shown in FIG. 3, the diffusion layer 500 preferably covers the thin-film circuit layer 250. However, in other embodiments, the diffusion layer 500 may be disposed under the thin film circuit layer 250. When the diffusion layer 500 is disposed under the thin film circuit layer 250 and the refractive index is smaller than that of the light-guide thin-film circuit substrate 200, it can replace the low refractive layer 450 (as shown in FIG. 2d). Furthermore, in this embodiment, the diffusion layer 500 is formed on the circuit substrate 200 in the form of a thin film and includes a plurality of diffusion particles 510 within. The diffusion particles 510 are preferably permeated into the diffusion layer 500 or the raw materials before or during the thin film process. In the preferred embodiment, the diffusion particles 510 include methyl methacrylate (MMA), silicon dioxide ($SiO_2$), titanium dioxide ($TiO_2$), and the like. However, in other embodiments, the diffusion layer 500 may achieve the light diffusion effect through disposing light diffusion microstructures on the surface.

Figure 4:
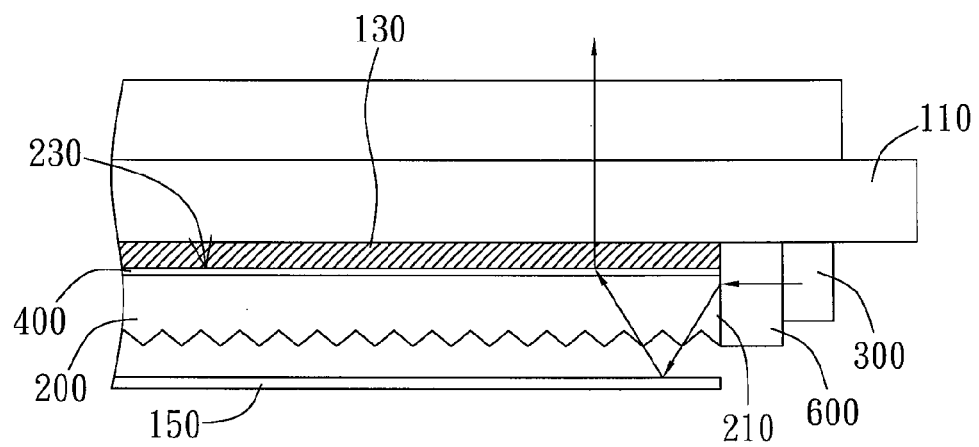
FIG. 4 is a cross-sectional schematic view of the display panel including the polarizer in accordance with one embodiment of the present invention

In the embodiment shown in FIG. 4, the display panel further includes a polarizer 600. The polarizer 600 is disposed between the light source 300 and the light entrance end 210 of the light-guide thin-film circuit substrate 200. The polarizer 600 preferably includes a polarizing film adhered to the light source 300 or to the light entrance end 210. It shall be noted that the above mentioned light entrance end 210 does not refer only to one end surface of the circuit substrate 200, but refers generally to the neighboring region of the end on the circuit substrate 200 receiving the light from the light source 300. For instance, the portion of the light exit top surface 230 close to the end surface of the circuit substrate 200 is also included within the boundary of the light entrance end 210.

In the embodiment shown in FIG. 4, two lateral sides of the polarizer 600 are connected closely to the light source 300 and to the end surface of the light entrance end 210 of the light-guide thin-film circuit substrate 200 respectively to reduce the impact of the intervening air layer on the light paths. As shown in FIG. 4, the light produced by the light source 300 first passes through the polarizer 600 and then enters the light entrance end 210 of the circuit substrate 200; in other words, the light entering the light entrance end 210 of the circuit substrate 200 is the polarized light.

Figure 5A:
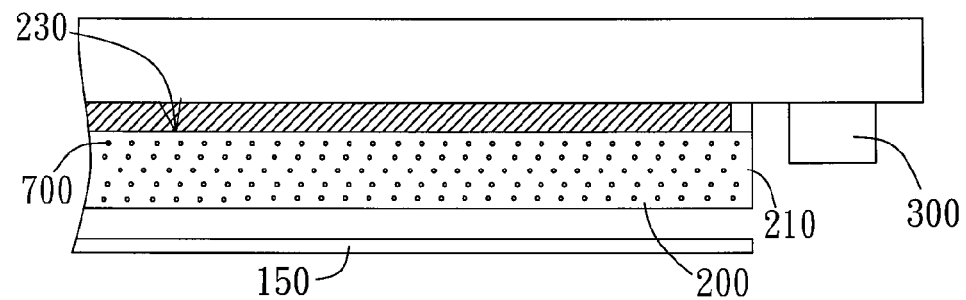
FIG. 5a is a cross-sectional schematic view of the display panel including the light deviating structures in accordance with one embodiment of the present invention.

FIG. 5a shows another embodiment of the present invention. In this embodiment, the display panel includes the light-guide thin-film circuit substrate 200, the reflector 150, the light source 300 and a plurality of light deviating structures 700. In this embodiment, the circuit substrate 200, the reflector 150 and the light source 300 are disposed in a way similar to the previous embodiment. The light deviating structures 700 are included at the circuit substrate 200 and distributed along a direction parallel to the light exit top surface 230; in other words, the light deviating structures 700 are disposed on or within the circuit substrate 200. As shown in FIG. 5a, the circuit substrate 200 guides the light produced by the light source 300 through the internal reflection to distribute on the light exit top surface 230, and the light deviating structures 700 cause the light within the circuit substrate 200 to deviate, therefore the internal reflection is further affected and the light output from the light exit top surface 230 is more uniform.

In the embodiment shown in FIG. 5a, the light deviating structures 700 are formed within the light-guide thin-film circuit substrate 200. In this embodiment, the light deviating structures 700 include bubbles formed within the circuit substrate 200. The bubbles are preferably formed within certain spots of the circuit substrate 200 by laser injection. However, in other embodiments, other physical or chemical methods may be employed to produce the bubbles as the light deviating structures 700. Moreover, in still other embodiments, the light deviating structures 700 may be formed through implanting particles, alloys, etc. As shown in FIG. 5a, the light produced by the light source 300 enters the circuit substrate 200 through the light entrance end 210. A partial light reaches to the far end of the circuit substrate 200 through the total internal reflection and the reflection of the reflector 150, and other partial light deviates through the light deviating structures 700 to transmit directly to the light exit top surface 230, or forms the emitting light through another reflection. Excessive total internal reflection (TIR) within the circuit substrate 200 can be prevented through disposing the light deviating structures 700 and thereby produce the uniform light distribution on the light exit top surface 230.

Figure 5B:
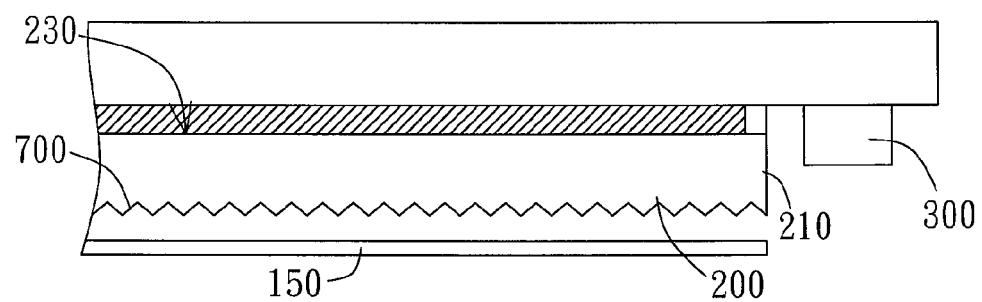
FIG. 5b is a schematic view of the display panel including the light deviating structures in accordance with another embodiment of the present invention.

In the embodiment shown in FIG. 5b, the light deviating structures 700 are formed on the bottom surface of the light-guide thin-film circuit substrate 200. The light deviating structures 700 in this embodiment includes protrusions formed on the bottom surface of the circuit substrate 200, and the side facing the circuit substrate 200 of those protrusions have a plurality of inclined planes sloped towards the light entrance end 210. The protrusions can be formed on the bottom surface of the circuit substrate 200 by printing, rolling, etching or micromechanical cur machining.

As shown in FIG. 5b, the light entering the light-guide thin-film circuit substrate 200 is transmitted to other areas of the circuit substrate 200 partially through the total reflection, and the partial light through the reflection of the light deviating structures 700 changes its original total reflection path, and then emits to the outside of the circuit substrate 200 through the light exit top surface 230. Moreover, in other embodiments, the light deviating structures 700 formed on the circuit substrate 200 do not limit to the serrated protrusions in this embodiment, but may be other-shaped structures, such as hemispherical protrusions or waved protrusions, or may be formed by adding or by changing partial materials on the bottom surface.

Figure 6A:
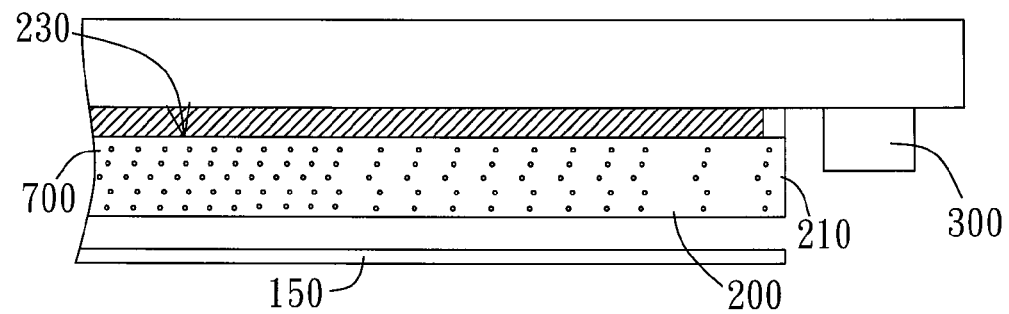
FIG. 6a-FIG. 6b are schematic views of the display panel including the light deviating structures in accordance with another embodiment of the present invention.
Figure 6B:
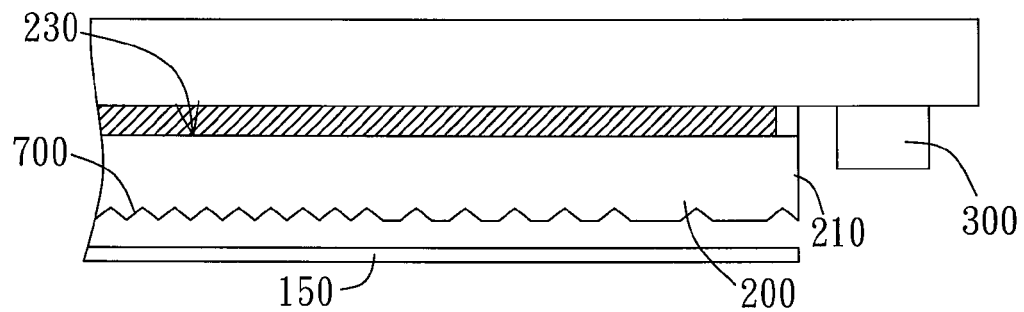

As shown in FIG. 6a and FIG. 6b, the light deviating structures 700 spread within the light-guide thin-film circuit substrate 200 or on the bottom surface have a variable distribution density. In the embodiment shown in FIG. 6a and FIG. 6b, the light deviating structures 700 close to the light source 300 have a smaller distribution density; in other words, the portion of the circuit substrate 200 further away from the light source 300 has a greater distribution density of the light deviating structures 700. Through the varied distribution density of these light deviating structures 700, excessive light on the portion of the circuit substrate 200 close to the light source 300 can be prevented from reflecting to the light exit top surface 230 to adjust the light distribution on the light exit top surface 230.

Figure 7A:
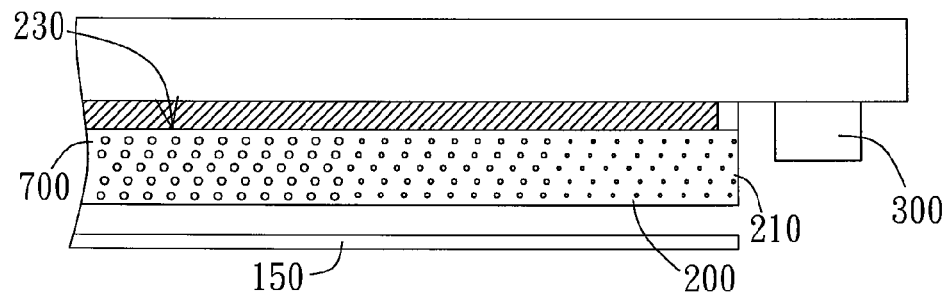
FIG. 7a-FIG. 7b are schematic views of the display panel including the light deviating structures in accordance with another embodiment of the present invention.
Figure 7B:
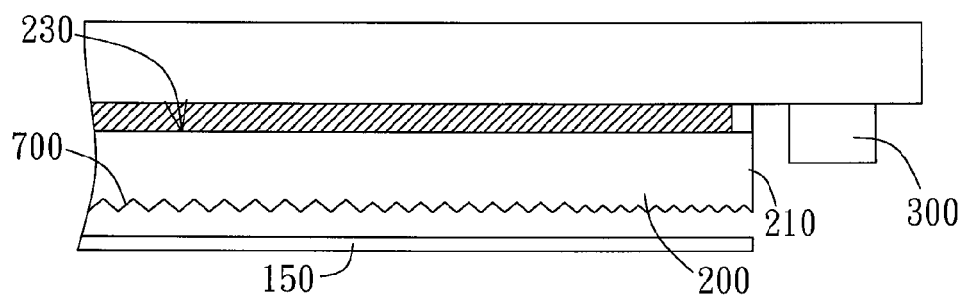

As shown in FIG. 7a and FIG. 7b, the light deviating structures 700 spread within the light-guide thin-film circuit substrate 200 or on the bottom surface have a variable cross-section dimension. In these embodiments, the light deviating structures 700 close to the light source 300 have smaller cross-section dimensions; in other words, the light deviating structures 700 distributed on the portion of the circuit substrate 200 further away from the light source 300 have greater sizes of cross sections. Through the varied cross-section dimensions of these light deviating structures 700, excessive light on the portion of the circuit substrate 200 close to the light source 300 can be prevented from reflecting to the light exit top surface 230 to uniform the light distribution on the light exit top surface 230. The macroscopic view of the embodiments shown in FIG. 6a, FIG. 6b, FIG. 7a and FIG. 7b illustrates the light distribution on the light exit top surface 230 can be adjusted and uniformed by varying the occupied area percentage of the light deviating structures 700 on the cross section or on the bottom surface of the circuit substrate 200.

Figure 8A:
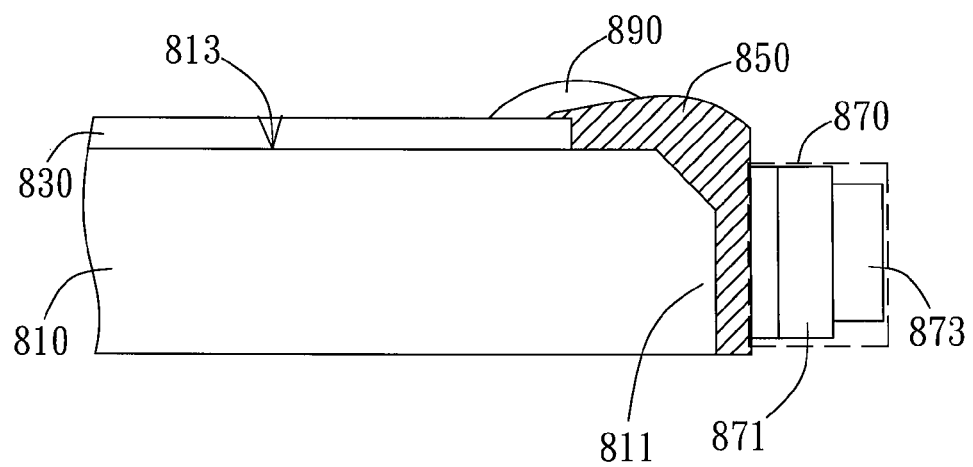
FIG. 8a is a cross-sectional schematic view of the display panel in accordance with another embodiment of the present invention.

FIG. 8a shows another embodiment of the present invention. In this embodiment, the display panel includes a light guide substrate 810, a circuit 830, a plurality of coupling portions 850 and a light source 870. The light guide substrate 810 has a light entrance end 811 and a top surface 813, and the light entrance end 811 is on the end portion of the top surface 813. The light guide substrate 810 is made of transparent or semitransparent materials; in the preferred embodiment, the light guide substrate 810 can be made of organic resin materials, glass, quartz, or other transparent or semitransparent materials.

As shown in FIG. 8a, the circuit 830 is formed on the top surface 813 of the light guide substrate 810. In the preferred embodiment, the circuit 830 is a thin-film circuit layer covering the top surface 813.

A plurality of coupling portions 850 is disposed on the end surface of the light entrance end 811 of the light guide substrate 810. The coupling portions 850 also extend to the top surface 813 of the light guide substrate 810 to connect with the circuit 830. The coupling portions 850 are preferably made of conductive adhesive materials of organic resins. The conductive adhesive materials are preferably the mixture of the adhesive materials and conductive materials, and the conductive materials have to be dispersed evenly within the adhesive materials. Common adhesive materials include thermosetting or photo-curing adhesives. Common thermosetting adhesives include polyesters, epoxy, silicone, urethanes, etc. Such high molecular materials facilitate the condensation and crosslinking reactions when heat, pressure or a catalyst is applied to produce 3-dimensional reticulate-structure polymers having good corrosion resistant and humidity resistant properties, and suitable mechanical strength and reliability as well. The photo-curing high molecular portions can be acrylate, such as urethane diacrylate and epoxy diacrylate, and the photo initiator includes benzophenone. The conductive materials include silver, carbon, or other conductive materials wholly mixable with adhesive materials.

Figure 8B:
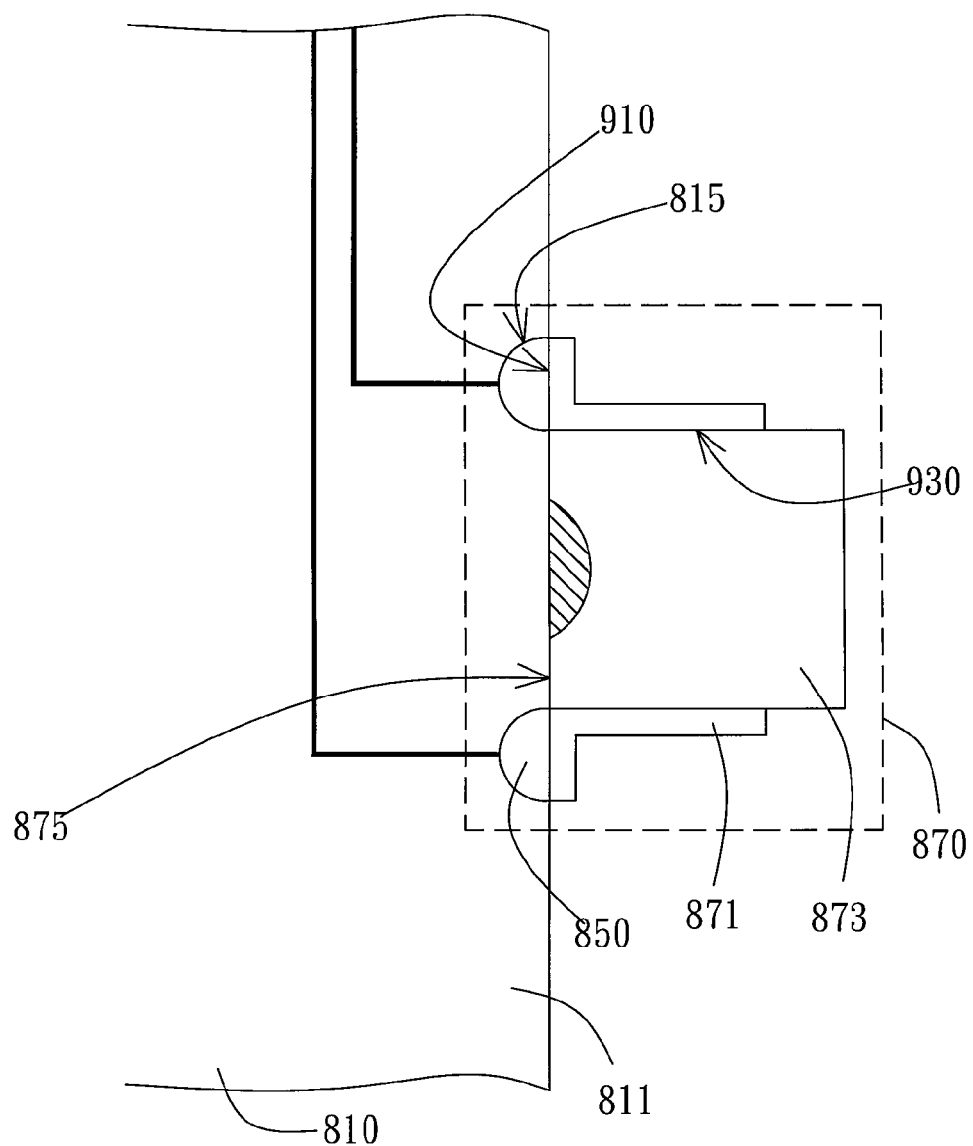
Figure 9:
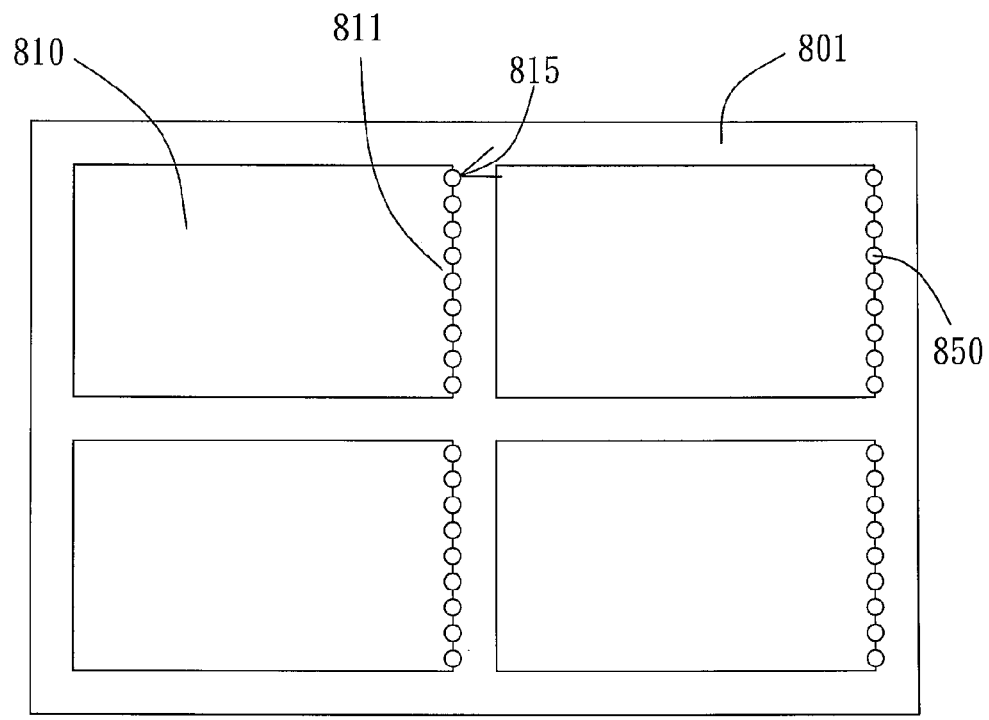
FIG. 9 is a top view of the light guide substrate before been cut from a base substrate in one embodiment.

As shown in FIG. 8b and FIG. 9 illustrating the top view of the display panel, a plurality of grooves 815 are formed on the end surface of the light entrance end 811 of the light guide substrate 810. In the preferred embodiment, as shown in FIG. 9, hole drilling can be performed on the light entrance end 811 of the top surface 813 before the light guide substrate 810 is cut from a base substrate 801. Next, the grooves 815 are formed on the end surface of the light entrance end 811 after cutting the light guide substrate 810 from the base substrate 801, and the cutting line has to pass through all the grooves 815 while cutting.

As shown in FIG. 8b, one end of each groove 815 is exposed to the top surface 813 of the light guide substrate 810, and a portion or the whole part of each coupling portion 850 is disposed respectively within different grooves 815. In the preferred embodiment, as shown in FIG. 9, materials, such as conductive adhesive materials of organic resins, forming the coupling portions 850 can be injected into the holes on the light entrance end 811 before cutting the light guide substrate 810 from the base substrate 801. While cutting the light guide substrate 810, the coupling portions 850 partially or wholly contained within the grooves 815 are cut as well.

In the embodiment shown in FIG. 8a, the display panel further includes a protective film 890. The protective film 890 covers the spot where the coupling portions 850 connect with the circuit 830. The protective film 890 may be formed by applying adhesives, film coatings or other suitable methods on the spot where the coupling portions 850 connect with the circuit 830. In addition, the material of the protective film 890 includes insulating or conductive materials. The coupling portions 850 are prevented from poor connection with or disengaging from the circuit 830 through disposing the protective film 890.

Next, refers to FIG. 8b, the light source 870 includes a paired pins 871 and a light emitting unit 873. The paired pins are electrically coupled to the coupling portions 850 respectively, and the connection methods include welding, adhesion and other non-conduction-hindering methods. The light emitting unit 873 is disposed between the paired pins 871 and is electrically coupled to the paired pins 871. The light emitting unit 873 is preferably a light emitting diode (LED); however, in other embodiments, the light emitting unit 873 may be other point light source or a linear light source. As shown in FIG. 8b, the light emitting unit 873 has a light emitting surface 875 facing the light entrance end 811 of the light guide substrate 810. The light produced by the light emitting unit 873 enters the light entrance end 811 through the light emitting surface 875 and is distributed on the top surface 813 of the light guide substrate 810 through the light guide substrate 810.

Figure 10:
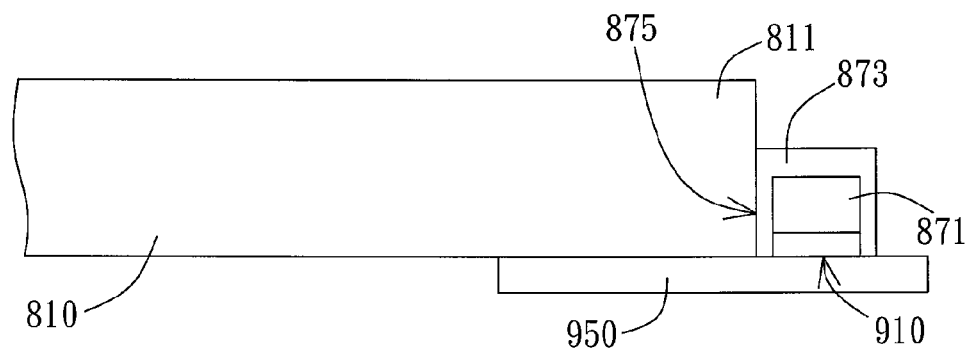
FIG. 10 is a cross-sectional view of the display panel in another embodiment.

As shown in FIG. 8a and FIG. 8b, the paired pins 871 preferably include a L-shaped conductive structure including a power supply connecting surface 910 and a light-emitting-unit-connecting surface perpendicular to each other. The power supply connecting surface 910 is electrically coupled to the circuit 830 providing signals, and the light-emitting-unit-connecting surface 930 is electrically coupled to the light emitting unit 873. In this embodiment, the power supply connecting surface 910 and the light emitting surface 875 of the light emitting unit 873 both face the same direction. In other words, the power supply connecting surface 910 faces the end surface of the light entrance end 811 of the light guide substrate 810 and is electrically coupled to the coupling portions 850. The light emitting surface 875 of the light emitting unit 873 also faces the end surface of the light entrance end 811 and emits light toward the light entrance end 811. However, in another embodiment, as shown in FIG. 10, the power supply connecting surface 910 may be perpendicular to the light emitting surface 875. In this embodiment, the paired pins 871 are not directly connected to the light guide substrate 810, but are connected to a light source substrate 950. The power supply method for the light emitting unit is, as the conventional method, by providing the light emitting unit 873 the power supply through the light source substrate 950.

Figure 11:
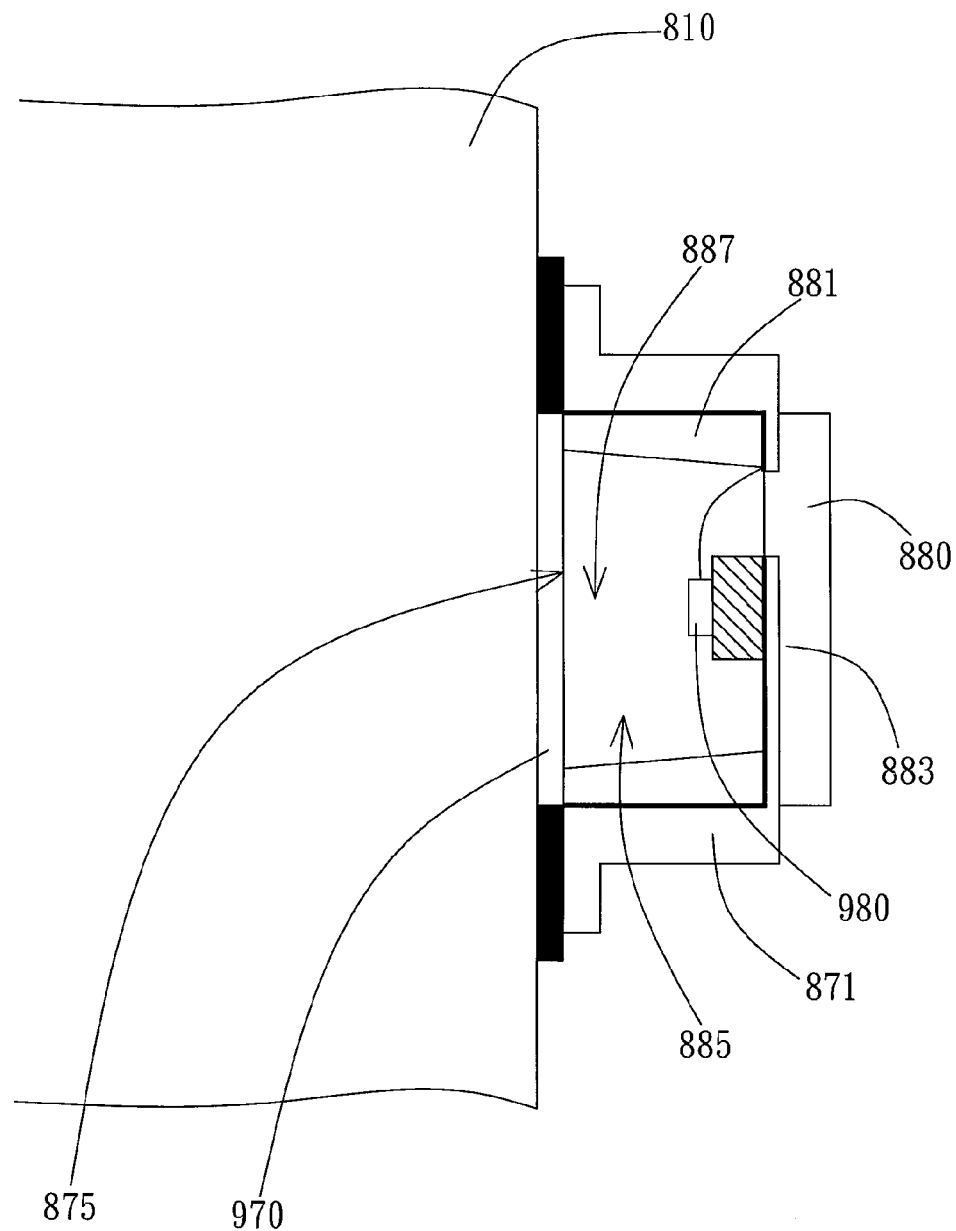
FIG. 11 is a schematic view of the light source device in one embodiment.

In the embodiment shown in FIG. 11, the light source 870 includes a polarizer 970 disposed on the light emitting surface 875. The polarizer 970 is preferably a polarized film formed by a plurality of film coatings. The light produced by the light emitting unit 873 enters the polarizer 970 after leaving the light emitting surface 875. When the light emits outward through the polarizer 970, the light is turned into a polarized light. As shown in FIG. 11, the light emitting unit 873 includes a main body 880 and an electroluminescence unit 980. The main body 880 is disposed corresponding to the paired pins 871, and an inner space 885 and a light exit 887 are enclosed by side walls and a bottom surface 883. The side walls 881 preferably include a reflective inner surface and predetermined reflective angle. Fluorescent powders or other chemical materials are preferably sprayed on the inner space 885.

As shown in FIG. 11, the electroluminescence unit 980 is contained within the inner space 885 of the main body 880, and the two electrodes thereof are electrically coupled to the paired pins either directly or through the wires. The electroluminescence unit 980 is preferably a light emitting diode transistor. The side having the light exit 887 of the main body 880 forms the overall light emitting surface 875, and the polarizer 970 is disposed on the main body 880 and covers the light exit 887. When the electroluminescence unit 980 produces light, the light emits outward from the light exit 887 and forms polarized light after passing through the polarizer 970, and then leaves the light source 870. However, in other embodiments, the main body 880 may be an optical lens made of light-pervious materials and envelops the electroluminescence unit 980 by forming as an integral part. In other words, the electroluminescence unit 980 is embedded in the main body 880. Since the main body 880 has both packaging and optical lens effect, the light has to first pass through the main body 880 before emitting outward. The light exit 887 at this point does not limit to the space enclosed by the main body 880 in FIG. 11, but includes the portion of the main body 880 allowing the light to emit outward.

From the foregoing, it shall be appreciated that specific embodiments of the invention have been described herein for purposes of illustration, but that various modifications and alterations may be made by those skilled in the art without deviating from the spirit and scope of the invention. For example, it shall be understood that there is no intention to limit the light deviating structures 700 to the specific forms disclosed, but on the contrary, the invention is to cover all modifications, alternate constructions and equivalents falling within the spirit and scope of the invention. Accordingly, the invention is not limited except as by the appended claims.

What is claimed is:
1. A light source device comprising:
a paired pins;
a light emitting unit disposed between the paired pins and coupled to the paired pin; wherein the light emitting unit has a light emitting surface, the light emitting unit includes:
a main body forming an inner space and having a light exit; and
an electroluminescence unit contained within the inner space and electrically coupled to the paired pins respectively; and
a polarizer disposed on the light emitting surface of the light emitting unit;
wherein one side of the main body having the light exit forms the light emitting surface, the polarizer is disposed on the main body and covers the light exit, so that light from the light emitting unit passes through the light emitting surface and the polarizer in sequence and rays outward.
2. The light source device of claim 1, wherein the polarizing member includes multi-layer coatings, polarizing coatings or polyvinyl alcohol (PVA) films with added iodine molecules.

* * * * *